United States Patent
Dahl et al.

(10) Patent No.: US 6,585,950 B1
(45) Date of Patent: *Jul. 1, 2003

(54) METHOD OF PRODUCING CHLORINE DIOXIDE

(75) Inventors: Anders Dahl, Saltsjö-Boo (SE); Roy Hammer-Olsen, Sundsvall (SE); Philip Byrne, Tullinge (SE)

(73) Assignee: Eka Nobel AB, Bohus (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/659,261

(22) Filed: Jun. 6, 1996

Related U.S. Application Data

(60) Provisional application No. 60/001,065, filed on Jul. 11, 1995.

(30) Foreign Application Priority Data

Jun. 7, 1995 (SE) ................................................ 9502078

(51) Int. Cl.[7] .............................................. C01B 11/02
(52) U.S. Cl. ...................................... 423/478; 423/551
(58) Field of Search ................................ 423/477, 478, 423/531, 551, 522

(56) References Cited

U.S. PATENT DOCUMENTS

| | | | |
|---|---|---|---|
| 3,341,288 A | | 9/1967 | Partridge et al. ............ 423/478 |
| 3,754,081 A | * | 8/1973 | De Vere Partridge et al. ... 423/478 |
| 3,974,266 A | * | 8/1976 | Fuller ......................... 423/478 |
| 4,081,520 A | * | 3/1978 | Swindells et al. ........... 423/478 |
| 4,104,365 A | * | 8/1978 | Howard et al. .............. 423/551 |
| 4,325,934 A | | 4/1982 | Swindells et al. ........... 423/478 |
| 5,116,595 A | | 5/1992 | Scribner et al. ............. 423/477 |
| 5,399,332 A | | 3/1995 | Pu .............................. 423/478 |

FOREIGN PATENT DOCUMENTS

| | | |
|---|---|---|
| EP | 445493 | 9/1991 |
| WO | 9411300 | 5/1994 |

OTHER PUBLICATIONS

Perry et al, "Chemical Engineers' Handbook", Fifth edition, TP155 p4, 1973, pp 19–57 to 19–87 (no month).*

* cited by examiner

*Primary Examiner*—Ngoc-Yen Nguyen
(74) *Attorney, Agent, or Firm*—David J. Serbin

(57) ABSTRACT

The invention relates to a process of producing chlorine dioxide comprising the steps of reducing chlorate ions in an acid reaction medium maintained in a reaction zone of a chlorine dioxide generator, which reaction medium contains alkali metal ions and sulfate ions, so to form chlorine dioxide and a solid salt of acidic alkali metal sulfate. The process further comprises the steps of separating said solid acidic alkali metal sulfate from the reaction medium, contacting said solid acidic alkali metal sulfate with an aqueous medium in a mixing tank to effect at least partial conversion to neutral solid alkali metal sulfate, separating the at least partially neutralized solid alkali metal sulfate from the aqueous medium on a rotary drum filter operating with vacuum inside and with part of the drum submerged in a slurry of the at least partially neutralized solid alkali metal sulfate and the aqueous medium, and forming an acid filtrate.

4 Claims, 2 Drawing Sheets

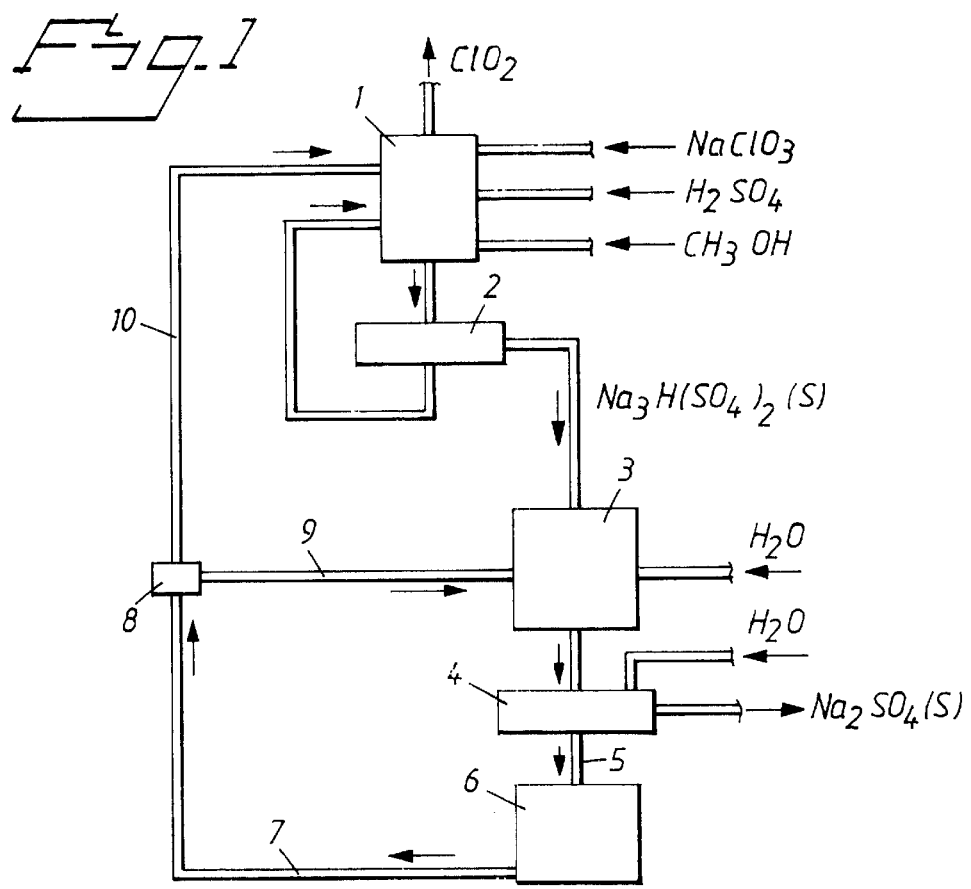
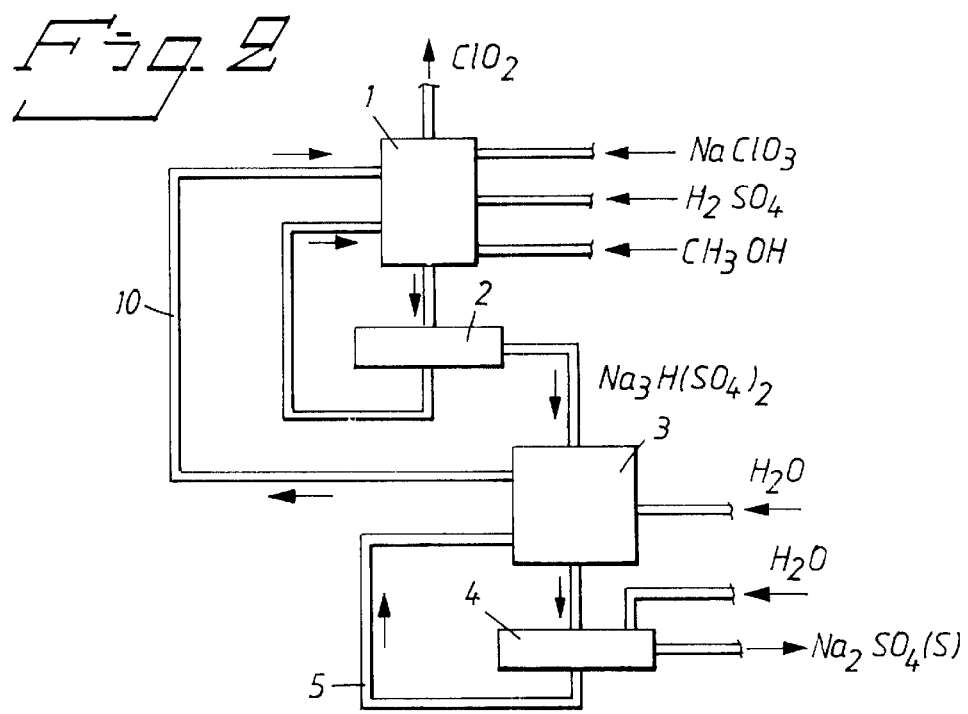

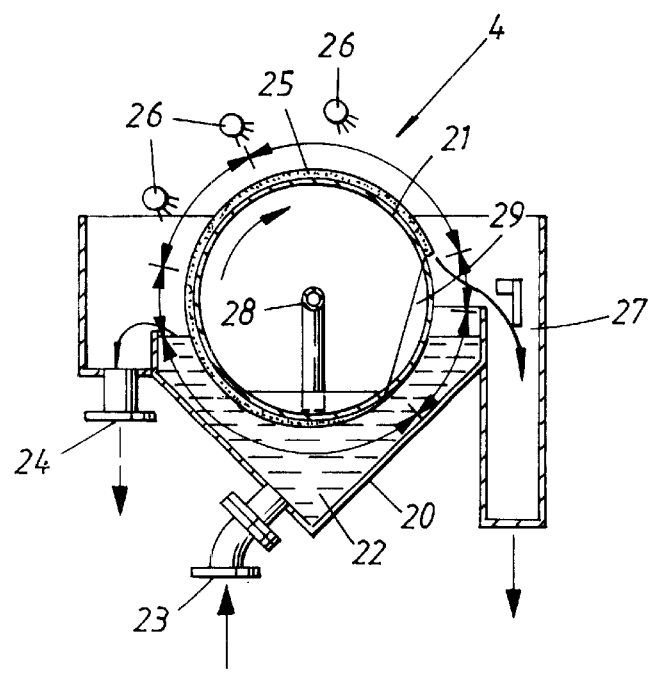
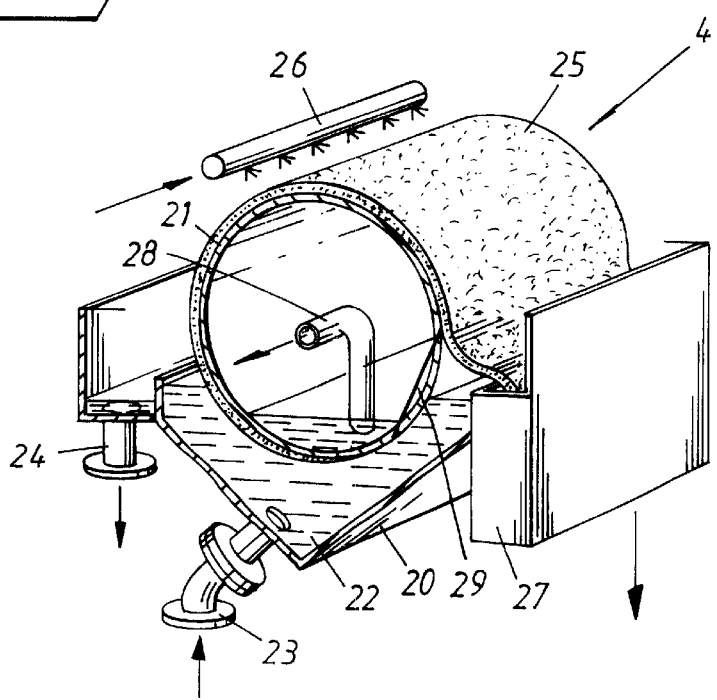

METHOD OF PRODUCING CHLORINE DIOXIDE

This application claims the benefit of provisional application 60/001,065, filed Jul. 11, 1995.

The present invention relates to a process of producing chlorine dioxide involving formation of solid acidic alkali metal sulfate as a by-product. The process comprises a step of decreasing the acidity of the alkali metal sulfate by treatment with an aqueous medium.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most processes in commercial use involves continuous reaction of alkali metal chlorate in an acidic medium with a reducing agent such as methanol, hydrogen peroxide, chloride ions or sulfur dioxide. The most efficient processes are operated at subatmospheric pressure in which the reaction medium boils and water is evaporated to dilute the chlorine dioxide formed. Generally, the acidity is provided by addition of sulfuric acid and the sulfate is withdrawn as a by-product in the form of solid alkali metal sulfate, normally sodium sulfate. If methanol is used as the reducing agent, it is possible to produce chlorine dioxide without formation or with very low formation of chlorine as a by-product. However, in order to achieve satisfactory production rate, it is necessary to operate the process at a high acidity, causing also the by-product alkali metal sulfate to be acidic. Thus, in the most commonly used subatmospheric processes operated with methanol as the reducing agent, such as in those described in the U.S. Pat. No. 4,081,520 or EP patent 445493, the solid by-product formed is acidic sodium sulfate, normally sodium sesqui sulfate. The acidic sodium sulfate normally has to be neutralized which causes consumption of caustic. Further, the acid lost with the acidic sulfate has to be replaced by supplying more acid to the chlorine dioxide reactor.

WO 94/11300 describes a method of neutralizing acidic sodium sulfate by treatment with an aqueous medium to effect conversion of the solid material to neutral sodium sulfate in a mixing tank and removing the solid material by filtration. The resulting acid aqueous medium can then be recirculated to the chlorine dioxide reactor. Similar processes are described in the U.S. Pat. Nos. 4,325,934 and 5,116,595.

However, it has been found difficult to operate the prior art processes in full scale without frequent interruptions. Particularly, fluctuations in the flow from the mixing tank and in the concentration of solid material therein causes clogging in the equipment for filtration.

SUMMARY OF THE INVENTION

It is an object of the present invention to provide a process of producing chlorine dioxide involving formation of acidic alkali metal sulfate as a by-product and neutralization of said acidic alkali metal sulfate, which process can be operated without frequent interruptions. The process should be simple and easy to operate without requiring too complicated and expensive equipment.

The invention concerns a process of producing chlorine dioxide comprising the steps of reducing chlorate ions in an acid reaction medium maintained in a reaction zone of a chlorine dioxide generator, which reaction medium contains alkali metal ions and sulfate ions, so to form chlorine dioxide and a solid salt of acidic alkali metal sulfate. The process further comprises the steps of separating said solid acidic alkali metal sulfate from the reaction medium, contacting said solid acidic alkali metal sulfate with an preferably acid aqueous medium in a mixing tank to effect at least partial conversion to neutral solid alkali metal sulfate, separating the at least partially neutralized solid alkali metal sulfate from the aqueous medium on a rotary drum filter operating with vacuum inside and with part of the drum submerged in a slurry of the at least partially neutralized solid alkali metal sulfate and the aqueous medium, and forming an acid filtrate.

DESCRIPTION OF THE PREFERRED EMBODIMENTS

It has been found that use of such a filter enables stable operation without interruptions caused by, for example, clogging in the equipment for filtration, even if there are considerable fluctuations in solid concentrations and the flow of the slurry from the mixing tank.

Suitably, from about 10 to about 60%, preferably from about 20 to about 45% of the filter drum is submerged in the slurry. The rotating speed of the filter is suitably from about 0.5 to about 50 rpm, preferably from about 5 to about 30 rpm.

Preferably, at least a portion of the acid filtrate is fed to the mixing tank. It is also preferred that an acid aqueous medium being a portion of the acid filtrate or acid aqueous medium from the mixing tank or a mixture thereof, is transferred to the reaction zone of the chlorine dioxide generator. Suitably, the process is operated to obtain an acidity of the aqueous medium transferred to the reaction zone of the chlorine dioxide reactor exceeding 4.8 N, preferably exceeding about 5.5 N, most preferably exceeding about 6.5 N. Generally it is hard to obtain an acidity exceeding about 7 N.

Suitably, the at least partially neutralized alkali metal sulfate is washed on the filter with an aqueous medium, preferably water, so to obtain alkali metal sulfate containing less then about 2% by weight of $H_2SO_4$, preferably less then about 1.5% by weight of $H_2SO_4$, most preferably less then about 1% by weight of $H_2SO_4$. The acid filtrate preferably is a mixture of filtered medium from the mixing tank and spent washing water. It is preferred to operate the process to achieve an acidity in the acid filtrate exceeding about 4.8 N, preferably exceeding about 5.5 N, most preferably exceeding about 6.5 N. Generally it is hard to obtain an acidity above about 7 N.

Suitably, an aqueous medium is supplied to the mixing tank, preferably in addition to the acid filtrate. The aqueous medium may for example be water or an aqueous solution of methanol, sodium chlorate, sodium chloride or mixtures thereof, of which water is preferred. Preferably, from about 5 to about 100%, most preferably from about 10 to about 90%, particularly from about 10 to about 25% of the total amount of water added to the system for neutralizing the alkali metal sulfate is supplied to the filter for washing the solid alkali metal sulfate, the remaining part preferably being supplied to the mixing tank. Suitably, the total amount of water added to the system is from about 0.1 to about 1 kg per kg alkali metal sulfate, preferably from about 0.3 to about 0.5 kg per kg acidic alkali metal sulfate.

Preferably, the average contact time between the solid alkali metal sulfate and the aqueous medium in the mixing tank is from about 5 minutes to about 5 hours. Preferably, the acidity of the aqueous medium in the mixing tank is maintained from about 4.8 to about 7 N, most preferably from about 5.5 to about 6.5 N. Suitably, the temperature in the mixing tank is maintained from about 20 to about 100° C. preferably, from about 40 to about 100° C., most preferably from about 60 to about 80° C. The temperature at the filter does not seem to significantly affect the efficiency of the performances and may for example be maintained from about 20 to about 100° C.

In one preferred embodiment, the acid aqueous medium transferred to the reaction zone of the chlorine dioxide generator substantially consists of acid filtrate from the filter for separating the solid alkali metal sulfate from the aqueous medium in the mixing tank. Preferably, from about 5 to about 40%, most preferably from about 10 to about 20% of the acid filtrate is transferred to the chlorine dioxide generator, the remaining portion preferably being fed to the mixing tank for contacting the acidic alkali metal sulfate. In this embodiment it is preferred that from 10 to 20% of the total amount of water added to the system for neutralizing the alkali metal sulfate is supplied to the filter for washing the solid alkali metal sulfate, the remaining part preferably being supplied to the mixing tank. In a preferred mode of operation, the acid filtrate is first transferred to a filtrate tank, for example by gravity, and then pumped to a device, for example a control valve, for dividing the filtrate stream into one portion fed to the mixing tank and into another portion supplied to the chlorine dioxide generator. The use of the filtrate tank enables more stable operation since control valves do not work satisfactory if they are fed with a fluctuating flow which normally is the case with liquid streams coming directly from a filter.

In another preferred embodiment, the acid aqueous medium transferred to the reaction zone of the chlorine dioxide generator substantially consists of acid aqueous medium from the mixing tank. It is preferred to separate the main part of the solid material, for example by decanting, or the like, before feeding the acid medium to the chlorine dioxide generator. In this embodiment it is preferred that substantially all the acid filtrate is fed to the mixing tank. It is also preferred that from about 5 to about 25% of the total amount of water added to the system for neutralizing the alkali metal sulfate is supplied to the filter for washing the solid alkali metal sulfate, the remaining part preferably being supplied to the mixing tank.

The chlorine dioxide generation as such can be performed according to any known, preferably continuous process involving formation of solid acidic alkali metal sulfate which normally is the case if the acidity of the reaction medium exceeds about 4.5 N and preferably is from about 5 to about 9 N. Examples of useful chlorine dioxide processes are the SVP®-lite process or the R8 process which are described in the earlier mentioned EP patent 445493 and U.S. Pat. No. 4,081,520 respectively, the disclosures of which are incorporated herein by reference. The alkali metal could be any group I metal such as sodium, potassium or mixtures thereof, of which sodium normally is preferred. The acidic alkali metal sulfate formed in the chlorine dioxide generator is normally alkali metal sesqui sulfate, preferably sodium sesqui sulfate.

The invention will now be described in detail with reference to the drawings, of which FIGS. 1 and 2 show the flow sheets of two different embodiments and FIGS. 3 and 4 schematically show a preferred filter to be used. However, the invention is not limited to the shown embodiments, but many different modes of operation are possible within the scope of the claims.

Referring to FIG. 1, sodium chlorate, sulfuric acid and methanol are supplied to a chlorine dioxide generator 1, preferably operated according to any of the SVP®-lite or the R8 processes. In the generator 1 an acid aqueous reaction medium containing sodium ions, sulfate ions and chlorate ions is maintained at subatmospheric pressure at a temperature sufficient to effect boiling. Chlorate ions are reduced by methanol to form chlorine dioxide gas which is withdrawn together with evaporated water. Solid sodium sesqui sulfate precipitates and is separated from the reaction medium on a first filter 2 and transferred to a mixing tank 3 in which it is contacted with an acid aqueous solution containing sodium sulfate to form a slurry, the acidity of the solution preferably being from about 5.5 to about 6.5 N. In the mixing tank 3 the solid sodium sesqui sulfate is partially converted to neutral sodium sulfate which is separated from the aqueous solution on a second filter 4 on which the filter cake is washed with sufficient water to obtain solid sodium sulfate containing less than about 2% by weight of $H_2SO_4$. The acid aqueous solution and the spent washing water are mixed to form an acid filtrate 5 which is transferred to a filtrate tank 6. An acid filtrate stream 7 is pumped to a device 8, for example a control valve, dividing the acid filtrate 7 to one stream 9 leading to the mixing tank 3, and another stream 10 leading back to the chlorine dioxide generator 1. The stream 10 preferably constitutes from about 10 to about 20% of the total acid filtrate stream 7. The amount of water added to the mixing tank 3 is preferably from about 0.28 to about 0.45 kg per kg sodium sesqui sulfate. The amount of water added to the second filter 4 for washing is preferably from about 0.04 to about 0.1 kg per kg sodium sesqui sulfate. Both the filters 2, 4 are preferably rotating drum filter operating with vacuum inside the drums. At least the second filter 4 is a bottom feed filter, preferably as shown in FIGS. 3 and 4, which can be operated without any cyclone or similar device for pre-concentrating the slurry, enabling more stable operation of the entire process than if a conventional top feed filter is used. Preferably also the first filter 2 is a bottom feed filter of similar construction. The entire process is preferably operated continuously.

Referring to FIG. 2, the chlorine dioxide generator 1, the first filter 2, the mixing tank 3 and the second filter 4 is operated substantially as described in the embodiment of FIG. 1. However, the entire acid filtrate stream 5 is transferred to the mixing tank 3 and acid aqueous medium from the tank 3 is recycled to the generator 1, preferably after some kind of sedimentation or other treatment to decrease the amount of solids being brought back to the generator 1. The amount of water added to the mixing tank 3 is preferably from about 0.28 to about 0.45 kg per kg sodium sesqui sulfate. The amount of water added to the second filter 4 for washing is preferably from about 0.04 to about 0.1 kg per kg sodium sulfate. The acidity of the solution in the mixing tank 3 is preferably from about 5.5 to about 6.5 N.

Referring to FIGS. 3 and 4, a preferred bottom feed filter 4 to be used comprises a rotating drum 21 with vacuum inside, preferably rotating with a speed from 5 to 30 rpm. Preferably from 20 to 45% of the drum 21 is submerged in a slurry 22 of partially neutralized sodium sulfate in an aqueous medium. The slurry 22 is maintained in a trough 20 provided with an overflow outlet 24. The slurry 22 is preferably fed continuously to the trough 20 directly from the mixing tank 3 (see FIGS. 1 and 2) through an inlet 23. The liquid phase is passed through the filter to the inside of the drum 21, while the solid partially neutralized sodium sulfate forms a filter cake 25 which is washed on the drum by water supplied from spray nozzles 26 arranged in one, two, three or several lines. Excess slurry may leave the trough 20 through an overflow 24 and is preferably recirculated. The spent washing water is combined with the filtrate from the slurry inside the drum 21 and leaves through an outlet 28, forming an acid filtrate stream (see stream 5 in FIGS. 1 and 2). The substantially neutral sodium sulfate is removed from the drum 21 by an air blowback over the segment 29 and leaves through a filter cake outlet 27.

What is claimed is:

1. A process of producing chlorine dioxide comprising the steps of reducing chlorate ions in an acid reaction medium maintained in a reaction zone of a chlorine dioxide generator, which reaction medium contains alkali metal ions and sulfate ions, thereby forming chlorine dioxide and a solid salt of acidic alkali metal sulfate, separating said solid acidic alkali metal sulfate from the reaction medium, contacting said solid acidic alkali metal sulfate with an aqueous medium in a mixing tank to effect at least partial conversion to neutral solid alkali metal sulfate, separating the at least partially neutralized solid alkali metal sulfate from the aqueous medium on a rotary drum filter operating with vacuum inside and with part of the drum submerged in a slurry of the at least partially neutralized solid alkali metal sulfate and the aqueous medium, forming an acid filtrate and feeding at least a portion of the acid filtrate to the mixing tank.

2. A process of producing chlorine dioxide comprising the steps of reducing chlorate ions in an acid reaction medium maintained in a reaction zone of a chlorine dioxide generator, which reaction medium contains alkali metal ions and sulfate ions, thereby forming chlorine dioxide and a solid salt of acidic alkali metal sulfate, separating said solid acidic alkali metal sulfate from the reaction medium, contacting said solid acidic alkali metal sulfate with an aqueous medium in a mixing tank to effect at least partial conversion to neutral solid alkali metal sulfate, separating the at least partially neutralized solid alkali metal sulfate from the aqueous medium on a rotary drum filter operating with vacuum inside and with part of the drum submerged in a slurry of the at least partially neutralized solid alkali metal sulfate and the aqueous medium, forming an acid filtrate, and transferring aqueous medium from the mixing tank to the reaction zone of the chlorine dioxide generator.

3. A process of producing chlorine dioxide comprising the steps of reducing chlorate ions in an acid reaction medium maintained in a reaction zone of a chlorine dioxide generator, which reaction medium contains alkali metal ions and sulfate ions, thereby forming chlorine dioxide and a solid salt of acidic alkali metal sulfate, separating said solid acidic alkali metal sulfate from the reaction medium, contacting said solid acidic alkali metal sulfate with an aqueous medium in a mixing tank to effect at least partial conversion to neutral solid alkali metal sulfate, separating the at least partially neutralized solid alkali metal sulfate from the aqueous medium on a rotary drum filter operating with vacuum inside and with part of the drum submerged in a slurry of the at least partially neutralized solid alkali metal sulfate and the aqueous medium, forming an acid filtrate, and adding water and the acid filtrate to the mixing tank.

4. A process as claimed in claim 2 wherein the process is operated to obtain an acidity of the aqueous medium transferred to the reaction zone of the chlorine dioxide reactor exceeds 4.8 N.

\* \* \* \* \*